United States Patent
Zhao et al.

(10) Patent No.: US 7,848,554 B2
(45) Date of Patent: Dec. 7, 2010

(54) SUB-VOXEL MOTION CORRECTION FOR PHASE-CONTRAST MAGNETIC RESONANCE IMAGING

(75) Inventors: Meide Zhao, Oswego, IL (US); Xiang He, Chicago, IL (US)

(73) Assignee: Vassol Inc., River Forest, IL (US)

( * ) Notice: Subject to any disclaimer, the term of this patent is extended or adjusted under 35 U.S.C. 154(b) by 542 days.

(21) Appl. No.: 12/033,693

(22) Filed: Feb. 19, 2008

(65) Prior Publication Data

US 2009/0022380 A1    Jan. 22, 2009

Related U.S. Application Data

(63) Continuation of application No. 11/771,047, filed on Jun. 29, 2007, now abandoned.

(60) Provisional application No. 60/817,584, filed on Jun. 29, 2006.

(51) Int. Cl.
*G06K 9/00* (2006.01)

(52) U.S. Cl. .................... 382/128; 382/162; 382/168

(58) Field of Classification Search ......... 382/128–132, 382/162–170
See application file for complete search history.

(56) References Cited

U.S. PATENT DOCUMENTS

| | | | |
|---|---|---|---|
| 6,181,817 B1 | 1/2001 | Zabih et al. | |
| 6,728,424 B1 | 4/2004 | Zhu et al. | |
| 6,775,405 B1 | 8/2004 | Zhu | |
| 2003/0065260 A1* | 4/2003 | Cheng et al. | 600/427 |
| 2005/0013471 A1 | 1/2005 | Snoeren et al. | |
| 2005/0152617 A1 | 7/2005 | Roche et al. | |
| 2006/0029291 A1 | 2/2006 | Sun et al. | |

FOREIGN PATENT DOCUMENTS

| WO | WO-2008005408 A2 | 1/2008 |
|---|---|---|
| WO | WO-2008005408 A3 | 1/2008 |

OTHER PUBLICATIONS

International Application Serial No. PCT/US2007/015312, International Search Report mailed Jun. 2, 2008, 6 pgs.
International Application Serial No. PCT/US2007/015312, Written Opinion mailed Jun. 2, 2008, 6 pgs.

* cited by examiner

*Primary Examiner*—Brian Q Le
(74) *Attorney, Agent, or Firm*—Schwegman, Lundberg & Woessner, P.A.

(57) ABSTRACT

A method and system are described for image registration using an information theoretic approach that can be used for correcting motion in blood flow studies as well as other applications. The joint probability distribution between two MRI (or other modality) images is estimated where the interpolation method is referred to as a continuous histogram.

14 Claims, 3 Drawing Sheets

SUB-VOXEL MOTION CORRECTION FOR PHASE-CONTRAST MAGNETIC RESONANCE IMAGING

RELATED APPLICATIONS

This application is a continuation application of U.S. patent application Ser. No. 11/771,047, filed Jun. 29, 2007 now abandoned, which application is based upon, and claims priority to, previously filed provisional application Ser. No. 60/817,584, filed on Jun. 29, 2006. The provisional application is hereby incorporated by reference. This application is related to U.S. patent application Ser. Nos. 09/400,365, 11/032,306 and 11/324,126, the disclosures of which are incorporated by reference in their entirety.

BACKGROUND

In magnetic resonance imaging, the spins of specific nuclei (usually hydrogen nuclei) in a tissue are excited by radiofrequency (RF) pulses in the presence of an applied static magnetic field in a selected direction, the magnitude of which is made to spatially vary in a defined time sequence. The precessional frequencies of the excited spins vary in relation to the magnitude of the applied magnetic field and thereby produce a precessional signal from which the spatial locations of the spins can be derived. By applying one or more excitation RF pulses and a specific sequence of linear spatial variations in the applied magnetic field, referred to as gradient pulses, the resulting precessional signal can be interpreted as a carrier waveform amplitude modulated by the Fourier transform of the spatial distribution of spin density in a selected portion of the tissue. The carrier waveform in this case is a complex sinusoid at the spin resonance frequency with no gradient applied (i.e., the Larmor frequency of the spin species). Transformation from the spatial frequency domain, referred to as k-space, to the image position domain can be accomplished by inverse Fourier transforming the k-space signal which is generated after demodulation of the precessional signal. The k-space signal is thereby transformed to a spin density function in position space which can be used to generate an image where the intensity of an image pixel varies in accordance with the magnitude of the spin density function at the pixel location. In order to image a selected volume of interest (VOI) in the body, an MRI data set is acquired which is made up of a plurality of slices derived from a two-dimensional (2D) spin density function or a plurality of slabs derived from a three-dimensional (3D) spin density function. As the term is used herein, "image" should be taken to mean either an actual visual representation or the data from which such a representation could be rendered. Similarly, a "pixel" or "voxel" should be taken to mean either a discrete element of an actual 2D or 3D visual representation, respectively, or the corresponding element of a 2D or 3D object from which such a representation could be rendered.

The time sequence of RF excitation and gradient pulses may be manipulated so that the spin density function derived from the k-space signal is dependent upon other parameters in addition to spin density, such as the spin-lattice relaxation time constant $T_1$ or the spin-spin relaxation time constant $T_2$. The time constant $T_1$ relates to the time required for spins to recover longitudinal magnetization after an excitation pulse, the longitudinal magnetization being necessary for the generation of an FID signal following an excitation pulse. A pulse sequence may be designed so that spins with a shorter $T_1$ are weighted more heavily in the spin density function, and a so-called $T_1$ weighted image may be derived from such a spin density function. The time-of-flight (TOF) method of imaging blood flow in tissue involves the use of repeated excitation pulses timed so that blood flowing from an unexcited region into the region excited by the pulses has a greater longitudinal magnetization than the stationary tissue in the excited region. The moving blood thus mimics a tissue with a short $T_1$ and produces an enhanced spin signal. TOF imaging may be used to selectively image blood vessels owing to the moving blood contained within the vessels.

Blood flow may be imaged and quantified by another technique, phase contrast magnetic resonance (PCMR). The k-space signal from the excited spins is a complex signal in which the real and imaginary components modulate the carrier waveform in phase quadrature. Ideally, inverse Fourier transformation of the k-space signal results in a purely real spin density function. Certain artifacts may cause the spin density function to have both real and imaginary parts, but this problem can be circumvented in normal imaging by varying the image pixel or voxel intensity in accordance with the magnitude of the spin density function to create a so-called magnitude image. In PCMR, on the other hand, a bipolar gradient pulse is used to cause flowing spins to acquire a phase which is proportional to the velocity of the spins in the direction of the gradient. After such phase-encoding of velocity, the phase can be extracted from the spin density function to measure the magnitude of blood flow. The extracted phase can also be used to construct an image where the pixel or voxel intensity varies with the phase of the spin density function at the location of the pixel or voxel, called a phase image. A phase image derived from a k-space signal derived after application of an appropriate through-plane bipolar gradient pulse can thus provide a visual representation of the magnitude of blood flow through the plane of the image.

DETAILED DESCRIPTION

Figure 1:
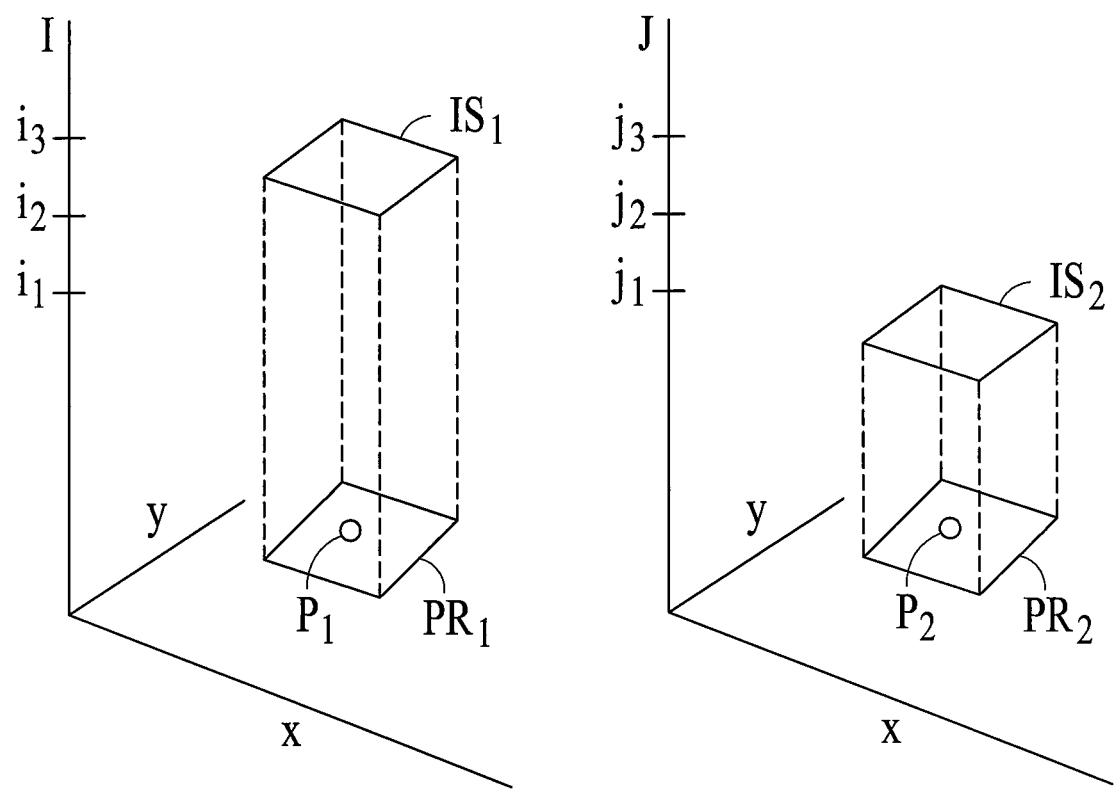
FIGS. 1 and 2 illustrate the process of updating joint histogram bins.

In blood flow studies such as described in U.S. patent application Ser. Nos. 09/400,365, 11/032,306 and 11/324,126, the model of blood vessel may be acquired from a set of Time-of-Flight (TOF) MRA images, from which vessels are manually or automatically detected and labeled. A 3D cut for a labeled vessel (with center position and plane orientation) may then be prescribed and, for each prescription, a set of PCMR images subsequently acquired. Any patient movement during TOF and PCMR acquisition may cause two problems. First, vessel of interest may not be located at the prescribed position in PCMR image. Secondly, the plane of PCMR image may not the same as the prescribed vessel cut plane. To estimate and compensate the patient movement, image alignment (also known as image registration) methods are often applied. Since the introduction of information theoretic based medical image registration methods in mid 1990's, these approaches have gained wide-spread interest and acceptance as one of the most accurate intensity based image registration methods. They have been shown to be capable achieving the same order of accuracy as the gold standard obtained using stereotactic frame and bone-implanted markers.

Information theoretic image registration methods are based upon the idea that images possess a quantifiable amount of entropy or information. A measure of the entropy or information content of a process is the so-called Shannon entropy H, defined as:

$$H = -\Sigma p_i \log p_i \text{ summed over all } i$$

where $p_i$ is the probability of an event i occurring. If log $p_i$ is the information content of an event i, then the entropy H is an average of the information content of all events with each event weighted according to its probability of occurrence.

When the Shannon entropy is computed for an image, an event is a particular gray value (a.k.a., intensity value) at a particular pixel location. The probability that a particular event will occur is then based upon the probability distribution of the possible gray values as derived from their frequency of occurrence in the image. A probability distribution of gray values can be estimated by counting the number of times each gray value occurs in the image and dividing those numbers by the total number of occurrences.

In order to compute the intensity probability distribution for an image, a bin is assigned to each possible intensity value. For example, if the intensity is quantized into Q discrete values, there are Q bins. The image is then processed pixel-by-pixel. Each time a pixel has an intensity value corresponding to a particular bin, the count for that bin is incremented. After processing of the entire image and dividing each bin value by the total number of pixels, the contents of the bins form a histogram that estimates the intensity probability distribution for the image, denoted as p(i) for i=1 through Q. Each p(i) thus equals the probability that a pixel selected randomly from the image will have an intensity value of i.

The entropy of an image may thus be computed from the intensity probability distribution of the image p(i) as:

$$H = -\Sigma p(i) \log p(i) \text{ summed over all } i \text{ from 1 through } Q$$

An image consisting of almost a single intensity will have a low entropy value and contains very little information. An image with a high entropy value, on the other hand, will have approximately equal quantities of many different intensities and will contain a great deal of information. Stated another way, the Shannon entropy of an image is a measure of the dispersion of the probability distribution of pixel intensities throughout the image. A sharply peaked distribution corresponds to a low entropy value, while a dispersed distribution corresponds to a high entropy value.

Entropy may also be measured for a pair of images that are superimposed in some manner such that each location in pixel space is mapped to a pair of intensity values by the two images. To compute this entropy, a joint intensity probability distribution function p(i,j) for the pixel intensities of the two images is defined, where for first and second images, p(i,j) gives the probability that randomly selected pixels from the first and second images have intensity values equal to i and j, respectively. The joint probability distribution function may be estimated from a joint histogram formed by assigning a bin to each possible pairwise combination of the possible intensity values, where one intensity value of the pair is associated with the first image and the other to the second image. The N pixels of each of image are then processed by pairwise combining pixels from taken from each of the first and second images in every possible combination. For each pixel pair, the intensity values of the pixels are determined, and the bin associated with that particular intensity value pair is incremented. Dividing the value of each bin in the joint histogram by the total number of pixel pairs, $N^2$, estimates the joint probability distribution function p(i,j) for the pixel intensities of the first and second images that gives the probability that randomly selected pixels from the first and second images have intensity values equal to i and j, respectively.

The entropy H of the joint probability distribution function of the two superimposed images may be computed as:

$$H = -\Sigma p(i,j) \log p(i,j) \text{ summed over all } i,j$$

If the superimposed first and second images are assumed to be similar, misalignment of the images will increase the dispersion of the joint probability distribution of intensity values. The images can therefore be considered to be in registration when the joint entropy H is minimized.

A refinement of the entropy minimization method involves the measure of mutual information MI computed from the joint probability distribution p(i,j) of the two images together and the probability distributions of each image alone p(i) and p(j), referred to as marginal probability distributions. The mutual information of two images is computed as:

$$MI = -\Sigma p(i,j) \log p(i) - \Sigma p(j) \log p(j) + \Sigma p(i,j) \log p(i,j)$$
$$\text{summed over all } i,j$$

In this method of registration, two images are considered to be in registration when their mutual information is maximized.

The registration process for two images involves variably superimposing the images and evaluating the entropy or mutual information after each superimposition. Conventionally, one image is regarded as the reference image and remains static, while the other image, referred to as the float image, is subjected to coordinate transformations. After each coordinate transformation of the float image, the entropy or mutual information of both images is evaluated by computing the joint histogram as described above. A serious problem can occur using these information theoretic registration methods, however, that hinders the possibility of achieving sub-voxel registration accuracy and threatens the robustness of the mutual information based alignment methods. After geometric coordinate transformation of an image, an interpolation mechanism is usually required to estimate the gray level values of the resulting points used in forming the joint histogram. Among the most popular ones are linear or high-order interpolation, which defines the intensity of a point as the weighted combination of the intensities of its neighbors. There are two basic flaws of such methods. First, they only update the entries corresponding to the gray level values of the neighborhood pixels in the image. For images with significant gradient content, this treatment may not be appropriate since theoretically, all intermediate pairs should also be updated. Therefore, artifacts in the mutual information estimation or entropy measure are created. The artifacts of several widely applied intensity interpolation methods are well documented in literature. The need for a better interpolation method to estimate mutual information has increased, especially with blood flow studies where the images involved lack sufficient features for most portions of images. The occurrence of interpolation artifacts can render the image alignment result highly unreliable.

Described herein is a method for estimating the joint probability distribution between two MRI (or other modality) images where the interpolation method is referred to as a continuous histogram. The main objective is to approximate the joint probability density functions of off-grid image translation by updating a continuous set of entries of the joint histogram of the nearby perfect grid-aligned transformations. The method may be applied to data of any dimension, including 3D and 2D data, and references to voxel and pixel are therefore interchangeable unless the context indicates otherwise. The method may also be combined with any of the methods or systems described in U.S. patent application Ser. Nos. 09/400,365, 11/032,306 and 11/324,126.

Using conventional interpolation methods, the pixel of an image is treated as a single point with a uniform gray level value. In reality, a gray level value of a pixel is just the sampling of a continuous spatial varying distribution with parameters characterized by the gradient on that pixel. By treating reference and target image asymmetrically, conventional interpolation based methods (e.g., partial volume methods) are asymmetrical for off-grid transformations. A better approach is to construct a histogram method would incorporate the information of the gradients of the pixel pairs from the reference and target (float) images. For example, if both pixels are from homogenous regions, only a single entry in the joint histogram needs to be updated. Otherwise, entries corresponding to all feasible gray level combinations should also be updated. The weight factor for each entry updating should be evaluated based on the characteristics of the pixel pair. Under this approach, each pixel on the reference or target image is extended into a 2D rectangle patch on the 3D imaging surface. Using the first order approximation, these patches are flat planes with normal vector as the cross product of the image gradient components along x and y direction. Hence, the approach described herein treats a pixel in the image not as point with one gray level value, but as a surface with a continuous gray level distribution. Thus, the contribution of a pixel pair to the joint histogram has a continuous distribution, while the shape of the distribution is determined by the gradient information at both pixel positions.

Figure 2:
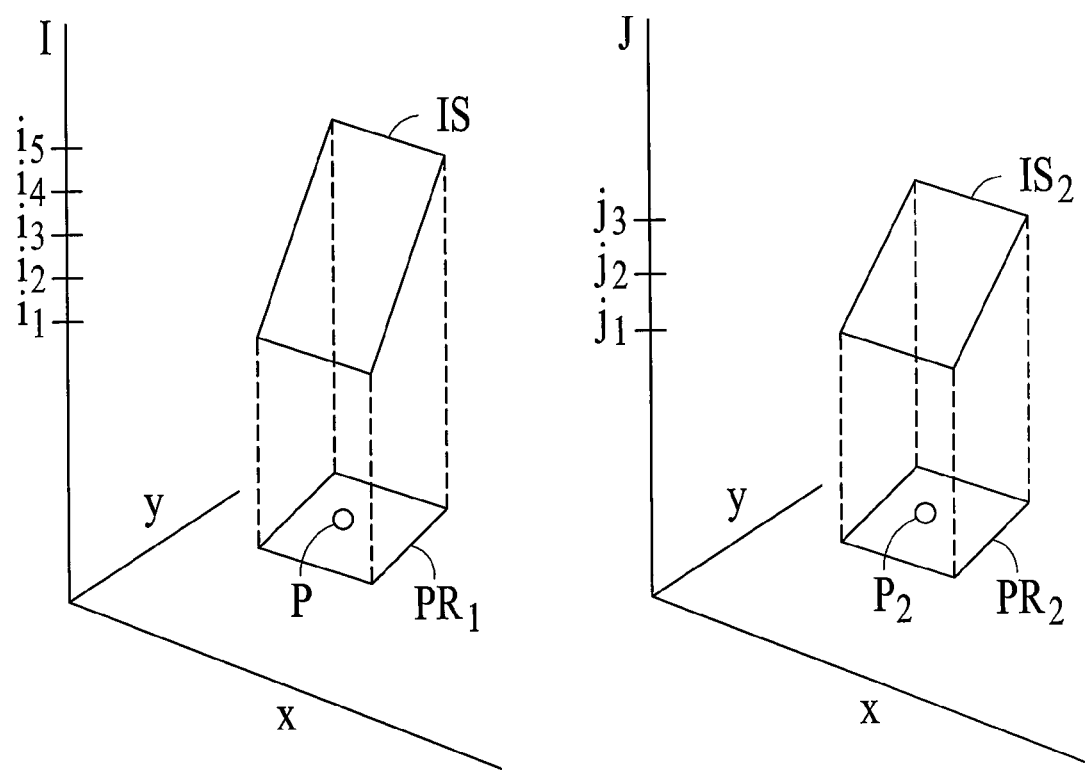

An exemplary illustration of what may be called the continuous histogram process of forming a joint histogram as described above will now be given. For each of two images, an intensity function is used to define the intensity values in the neighborhood of each pixel in the image. The intensity function maps locations in pixel space to intensity values in a continuous manner and is derived from the intensity value of the pixel around which the neighborhood is defined as well as surrounding pixels. The intensity function may correspond to the gradients of pixel intensity in orthogonal directions as determined from the individual pixel intensity values. In this example, as illustrated by FIGS. 1 and 2, the intensities of pixels $P_1$ and $P_2$ taken from first and second images, respectively, are evaluated in order to update the appropriate bin(s) of the joint histogram. The regions around pixels $P_1$ and $P_2$ that are evaluated in the presently described bin updating process are designated as pixel regions $PR_1$ and $PR_2$, respectively, and are defined with respect to x and y axes in pixel space. The intensity function maps the pixel regions $PR_1$ and $PR_2$ to intensity surfaces $IS_1$ and $IS_2$, respectively, with the pixel intensities of pixels $P_1$ and $P_2$ being samples of the intensity surfaces. The intensity values for the first and second images are with respect to axes labeled I and J, respectively. FIG. 1 illustrates the situation where the intensity surfaces for both the first and second images are flat (i.e., there is no x or y intensity gradient) and equal to the individual pixel intensities. In FIG. 1, the first and second image pixel intensities are $i_3$ and $j_1$, respectively. The joint histogram bin for the intensity pair $(i_3, j_1)$ is incremented to reflect this information. When the intensity surfaces are flat with no gradient, the continuous histogram approach is thus equivalent to the conventional method of updating the joint histogram. FIG. 2 illustrates another situation where an intensity gradient is present in both images. Both of the first and second images in the pixel regions around pixels $P_1$ and $P_2$ exhibit a positive gradient in the y direction, so that neither intensity surface is flat. The intensity surface of the first image spans intensity values from $i_1$ to $i_5$, and the intensity surface of the second image spans intensity values from $j_1$ to $j_3$. The intensity of pixel $P_1$ is $i_3$, and the intensity of pixel $P_2$ is $j_2$. The conventional approach would only increment the joint histogram bin for intensity pair $(i_3, j_2)$ based on this information. In one embodiment, the continuous histogram approach, on the other hand, would fractionally increment the joint histogram bins for intensity pairs $(i_3, j_2)$, $(i_1, j_1)$, $(i_2, j_1)$, $(i_4, j_3)$, and $(i_5, j_3)$ to reflect the occurrence of these values in the intensity surfaces of the two images. The fractional incrementing may be based upon a weighting factor reflective of the extent to which the pixel pair represents the intensity value pair for that bin is cumulatively added to the bin to thereby form a joint histogram. In one embodiment, the weighting factor used to increment a histogram bin for a particular intensity value pair approximates the fractional area of the pixel regions of the pixel pair for which the intensity surfaces of the pixel pair equals the intensity value pair. In another embodiment, the weighting factor used to increment a bin for a particular intensity value pair is a fractional weighting according to the number of bins updated by a particular pixel pair.

It should be noted that shape of the distribution is solely dependent on the gradients at the corresponding pixels. During implementation, a large portion of the coefficients can be pre-calculated and stored as a look-up table. Hence, the complexity of "continuous histogram" interpolation based methods is comparable with partial volume interpolation based ones.

Patient movement during blood flow studies such as described herein can thus pose serious problems. The movement, if not corrected, may cause uncertainty to determine the prescribed vessel for flow analysis. It is critical to align the Phase-Contrast Magnetic Resonance (PCMR) image with the 3D vessel model. An image registration method based on mutual information may be applied. However, the artifacts of mutual information estimation introduced by the existing intensity or volume based interpolation approaches are severe. To reduce or remove such artifacts, a method referred to as a "continuous histogram" has been described. Instead of viewing a pixel or voxel as a point to estimate the marginal and joint probability distribution function (2D histogram), in the "continuous histogram" approach, a pixel is viewed as a 2D surface patch. The intensity distribution of the patch is determined by its immediate neighbors. Hence, to estimate the joint probability distribution function, a corresponding pixel pair will update a continuous set of joint histogram entries, instead of to a single entry (gray level interpolation) or entries corresponding to its nearest neighboring pixels. By removing the interpolation artifacts from mutual information estimation, sub-voxel alignment accuracy can be achieved. Such accuracy is normally impossible to obtain since interpolation artifacts will normally shift the maximum position of the mutual information. At the same time, for TOF MRA and PCMR images, most areas are of low contrast, low information. The shape of mutual information estimation is very sensitive to the interpolation artifacts. By eliminating interpolation artifacts, a highly reliable alignment result is achievable.

Exemplary Embodiment

Figure 3:
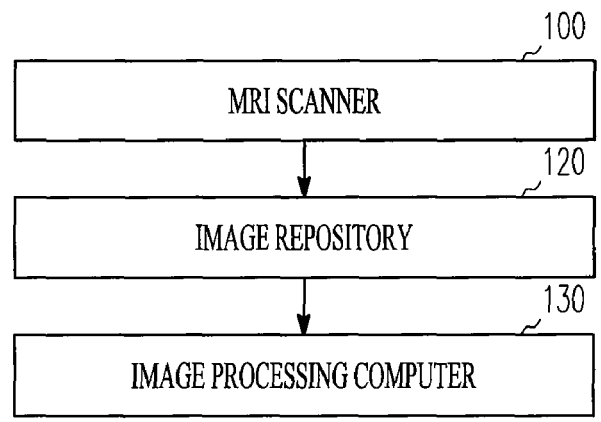
FIG. 3 depicts an exemplary system for implementing the described image registration method.

FIG. 3 illustrates an exemplary system that may used to implement the methods described herein. One system component is an MRI scanner 100 that includes a main magnet, gradient coils, RF coils, RF electronics, gradient amplifiers, pulse sequence computer, and an image reconstruction computer. The MRI scanner generates images and communicates the images to an image repository 120. An image processing computer 130 retrieves selected images from the image repository and is programmed to process the images using the methods described herein. The image processing computer may include an input device (e.g., keyboard) and a device for displaying the processed images to a user (e.g., a monitor).

Figure 4:
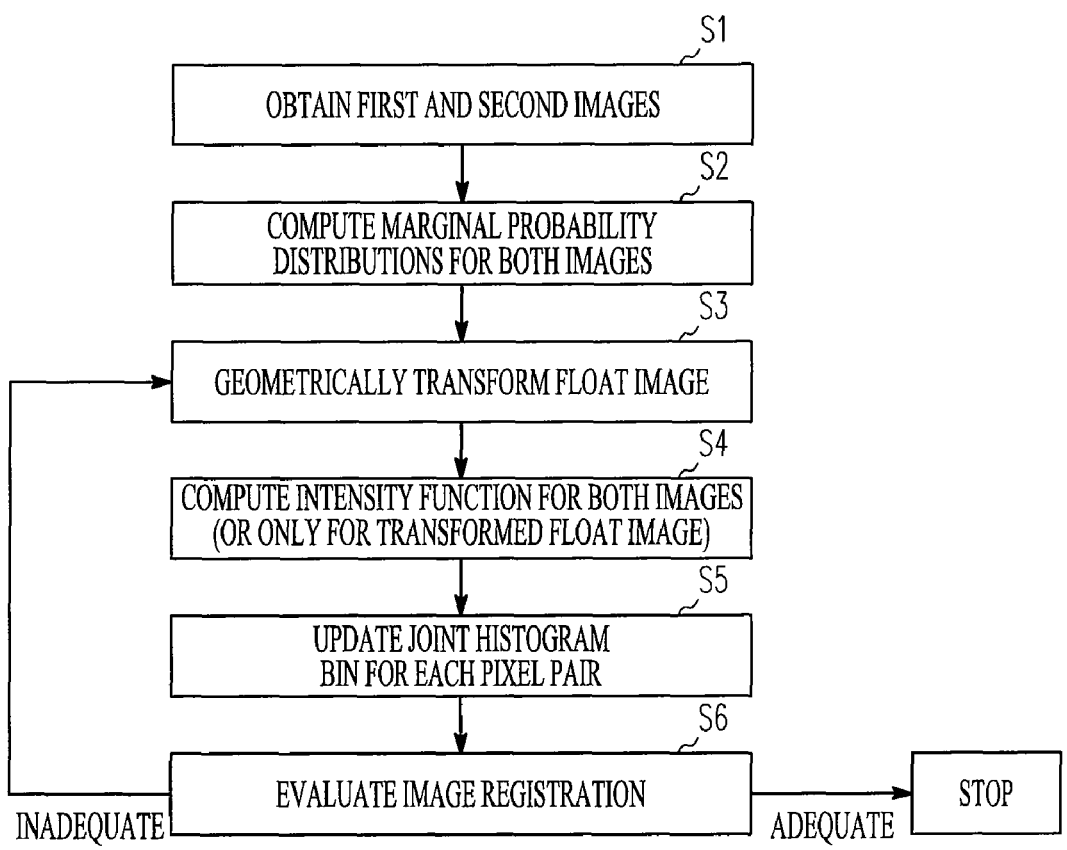
FIG. 4 illustrates an exemplary algorithm for image registration.

FIG. 4 illustrates an exemplary algorithm that could be executed by the image processing computer to correct for patient motion during the time between acquisition of time-of-flight and PCMR images or to otherwise align images from different sources or times. At step S1, intensity values are obtained for the N pixels (or voxels) making up each of a first image and a second image of a selected anatomical region, wherein each pixel intensity value is one of Q possible quantized intensity levels. At step S2, marginal probability distributions are computed for both of the first and second images. At step S3, the pixel locations of the second image, referred to as the float image, are geometrically transformed in an attempt to put the second image in registration with the first image, referred to as the reference image. A joint probability distribution function is employed as a part of an information theoretic measure of the degree to which the first and second images are in registration. The joint probability distribution function is estimated by performing steps S4 and S5. At step S4, an intensity function is computed for the region around each pixel of each of the first and second images, referred to as a pixel region, wherein the intensity function is a continuous mapping of points within the pixel region to intensity values and wherein the intensity value of the pixel associated with the pixel region is a sample of the intensity function. If the intensity function for the reference image has already been computed, an intensity function for the transformed float image only is computed at step S4. For example, the intensity function for a pixel region comprises gradient functions in x and y directions computed from the intensity values of a plurality of pixels neighboring the pixel region. A bin is assigned to each possible pairwise combination of the Q quantized intensity values, referred to as an intensity value pair. At step S5, for each pairwise combination of pixels from taken each of the first and second images, referred to as a pixel pair, each bin representing an intensity value pair that is mapped to by the corresponding intensity functions of the pixel pair is updated. When a particular bin is updated by a particular pixel pair, a weighting factor reflective of the extent to which that pixel pair represents the intensity value pair for that bin is cumulatively added to the bin to thereby form a joint histogram. In one embodiment, the weighting factor used to update a bin for a particular intensity value pair approximates the fractional area of the pixel regions of the pixel pair for which the intensity value functions of the pixel pair equal the intensity value pair. In another embodiment, the weighting factor used to update a bin for a particular intensity value pair is a fractional weighting according to the number of bins updated by a particular pixel pair. The value of each bin in the joint histogram is divided by the total number of pixel pairs, $N^2$, to thereby form an estimate of the joint probability distribution function p(i,j) for the pixel intensities of the first and second images that gives the probability that randomly selected pixels from the first and second images have intensity values equal to i and j, respectively. At step S6, the registration of the two images is evaluated by an information theoretic measure such as entropy or mutual information. If the images are not considered to be adequately registered, another geometric transformation of the float image is performed at step S3, and the process is repeated.

The continuous histogram method has been described with reference to magnetic resonance imaging based vessel flow analysis methods and systems and, more particularly, to the estimation and the correction of patient movement during such blood flow studies, where the flow analysis is based on images acquired at different time instances. However, the same method can also extended to other MRI (or other modality) applications involving sub-voxel or sub-pixel image registration.

The invention has been described in conjunction with the foregoing specific embodiments. It should be appreciated that those embodiments may also be combined in any manner considered to be advantageous. Also, many alternatives, variations, and modifications will be apparent to those of ordinary skill in the art. Other such alternatives, variations, and modifications are intended to fall within the scope of the following appended claims.

What is claimed is:

1. A method, comprising:
obtaining intensity values for the N pixels (or voxels) making up each of a first image and a second image of a selected anatomical region, wherein each pixel intensity value is one of Q possible quantized intensity levels;
geometrically transforming the pixel locations of the second image, referred to as the float image, in an attempt to put the second image in registration with the first image, referred to as the reference image; and,
employing a joint probability density function as a part of an information theoretic measure of the degree to which the first and second images are in registration, wherein the joint probability density function is estimated by:
computing an intensity function for the region around each pixel of each of the first and second images, referred to as a pixel region, wherein the intensity function is a continuous mapping of points within the pixel region to intensity values and wherein the intensity value of the pixel associated with the pixel region is a sample of the intensity function;
assigning a bin to each possible pairwise combination of the Q quantized intensity values, referred to as an intensity value pair;
for each pairwise combination of pixels from taken each of the first and second images, referred to as a pixel pair, updating each bin representing an intensity value pair that is mapped to by the corresponding intensity functions of the pixel pair;
wherein, when a particular bin is updated by a particular pixel pair, a weighting factor reflective of the extent to which that pixel pair represents the intensity value pair for that bin is cumulatively added to the bin to thereby form a joint histogram; and,
dividing the value of each bin in the joint histogram by the total number of pixel pairs, $N^2$, to thereby form an estimate of the joint probability distribution function p(i,j) for the pixel intensities of the first and second images that gives the probability that randomly selected pixels from the first and second images have intensity values equal to i and j, respectively.

2. The method of claim 1 wherein the weighting factor used to update a bin for a particular intensity value pair approximates the fractional area of the pixel regions of the pixel pair for which the intensity value functions of the pixel pair equal the intensity value pair.

3. The method of claim 1 wherein the weighting factor used to update a bin for a particular intensity value pair is a fractional weighting according to the number of bins updated by a particular pixel pair.

4. The method of claim 1 wherein an intensity function for a pixel region comprises gradient functions in x and y directions computed from the intensity values of a plurality of pixels neighboring the pixel region.

5. The method of claim 1 wherein the information theoretic measure of the degree of registration of the first and second images is the entropy H of the joint probability distribution function computed as:

$$H=-\Sigma p(i,j)\log p(i,j) \text{ summed over all } i,j$$

and wherein the images are considered to be in registration when the entropy H is minimized.

6. The method of claim 1 wherein the information theoretic measure of the degree of registration of the first and second images is the mutual information M of the two images computed as:

$$M=-\Sigma p(i)\log p(i)-\Sigma p(j)\log p(j)+\Sigma p(i,j)\log p(i,j)$$
summed over all $i,j$ and wherein the images are considered to be in registration when the mutual information M is maximized.

7. The method of claim 1 wherein the first and second images are time-of-flight magnetic resonance angiography and phase contrast magnetic angiography images.

8. A system, comprising:
an imaging scanner;
an image processing computer configured to receive images generated by the imaging scanner, wherein the image processing computer is programmed to:
obtain intensity values for the N pixels (or voxels) making up each of a first image and a second image of a selected anatomical region, wherein each pixel intensity value is one of Q possible quantized intensity levels;
geometrically transform the pixel locations of the second image, referred to as the float image, in an attempt to put the second image in registration with the first image, referred to as the reference image; and,
employ a joint probability density function as a part of an information theoretic measure of the degree to which the first and second images are in registration, wherein the joint probability density function is estimated by:
compute an intensity function for the region around each pixel of each of the first and second images, referred to as a pixel region, wherein the intensity function is a continuous mapping of points within the pixel region to intensity values and wherein the intensity value of the pixel associated with the pixel region is a sample of the intensity function;
assign a bin to each possible pairwise combination of the Q quantized intensity values, referred to as an intensity value pair;
for each pairwise combination of pixels from taken each of the first and second images, referred to as a pixel pair, update each bin representing an intensity value pair that is mapped to by the corresponding intensity functions of the pixel pair, wherein, when a particular bin is updated by a particular pixel pair, a weighting factor reflective of the extent to which that pixel pair represents the intensity value pair for that bin is cumulatively added to the bin to thereby form a joint histogram;
divide the value of each bin in the joint histogram by the total number of pixel pairs, $N^2$, to thereby form an estimate of the joint probability distribution function p(i,j) for the pixel intensities of the first and second images that gives the probability that randomly selected pixels from the first and second images have intensity values equal to i and j, respectively; and,
evaluate the registration of the images by an information theoretic measure using the computed joint probability distribution.

9. The system of claim 8 wherein the weighting factor used to update a bin for a particular intensity value pair approximates the fractional area of the pixel regions of the pixel pair for which the intensity value functions of the pixel pair equal the intensity value pair.

10. The system of claim 8 wherein the weighting factor used to update a bin for a particular intensity value pair is a fractional weighting according to the number of bins updated by a particular pixel pair.

11. The system of claim 8 wherein an intensity function for a pixel region comprises gradient functions in x and y directions computed from the intensity values of a plurality of pixels neighboring the pixel region.

12. The system of claim 8 wherein the information theoretic measure of the degree of registration of the first and second images is the entropy H of the joint probability distribution function computed as:

$$H=-\Sigma p(i,j)\log p(i,j) \text{ summed over all } i,j$$

and wherein the images are considered to be in registration when the entropy H is minimized.

13. The system of claim 8 wherein the information theoretic measure of the degree of registration of the first and second images is the mutual information M of the two images computed as:

$$M=-\Sigma p(i)\log p(i)-\Sigma p(j)\log p(j)+\Sigma p(i,j)\log p(i,j)$$
summed over all $i,j$ and wherein the images are considered to be in registration when the mutual information M is maximized.

14. The system of claim 8 wherein the first and second images are time-of-flight magnetic resonance angiography and phase contrast magnetic angiography images.

* * * * *